US011150143B2

(12) United States Patent
Skifton et al.

(10) Patent No.: US 11,150,143 B2
(45) Date of Patent: Oct. 19, 2021

(54) TEMPERATURE LOCALE SENSORS AND RELATED METHODS

(71) Applicant: Battelle Energy Alliance, LLC, Idaho Falls, ID (US)

(72) Inventors: Richard S. Skifton, Idaho Falls, ID (US); Lance A. Hone, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 454 days.

(21) Appl. No.: 16/193,366

(22) Filed: Nov. 16, 2018

(65) Prior Publication Data

US 2020/0158577 A1    May 21, 2020

(51) Int. Cl.
| | | |
|---|---|---|
| *G01K 11/00* | (2006.01) | |
| *G01N 25/02* | (2006.01) | |
| *G01K 1/00* | (2006.01) | |
| *G01K 11/02* | (2006.01) | |
| *G01D 21/00* | (2006.01) | |
| *G01K 11/04* | (2006.01) | |

(52) U.S. Cl.
CPC ............ *G01K 11/02* (2013.01); *G01D 21/00* (2013.01); *G01K 11/04* (2013.01)

(58) Field of Classification Search
USPC .......................................... 374/159, 16, 100
See application file for complete search history.

(56) References Cited

U.S. PATENT DOCUMENTS 3,851,527 A     12/1974   Hofman et al.
4,327,117 A  *  4/1982    Lenack .................. G01K 11/06
                                                    116/207

(Continued)

FOREIGN PATENT DOCUMENTS

GB           1565901 A        4/1980
WO       2017/186329 A1     11/2017

OTHER PUBLICATIONS

Skifton et al., "In-Pile Measurements of Fuel Road Dimensional Changes Utilizing the Test Reactor Loop Pressure for Motion," NPIC & HMIT, San Francisco, CA, (Jun. 2017) pp. 1905-1911.

(Continued)

*Primary Examiner* — Mirellys Jagan
(74) *Attorney, Agent, or Firm* — TraskBritt

(57) ABSTRACT

Temperature locale sensors include an enclosure defining a sealed volume with a phase-change material therein at a known pressure. The phase-change material is formulated to exhibit a gas-to-solid phase change, without condensing to a liquid phase, at the known pressure and a targeted temperature, i.e., the material's "deposition temperature." The phase-change material—while at least partially in gaseous form, either initially or after sublimation—is exposed to an environment with temperatures varying by location, including a maximum temperature above the phase-change material's deposition temperature and other temperatures at or below the deposition temperature. The gaseous phase-change material, in a location at the deposition temperature, solidifies from its gaseous phase to form solid grain deposits on a surface within the enclosure of the sensor. The solid deposits precisely identify the location of the specific, targeted deposition temperature.

21 Claims, 5 Drawing Sheets

(56) References Cited

U.S. PATENT DOCUMENTS

| | | |
|---|---|---|
| 9,939,326 B2 | 4/2018 | Nichols |
| 2013/0100981 A1* | 4/2013 | Lee .................. G01N 25/02 |
| | | 374/17 |
| 2013/0334045 A1 | 12/2013 | Kuhr et al. |
| 2018/0011502 A1 | 1/2018 | Brower et al. |
| 2018/0149569 A1 | 5/2018 | Synowczyk |
| 2018/0209013 A1 | 7/2018 | Stoner et al. |

OTHER PUBLICATIONS

Daw et al, "Temperature Monitoring Options Available at the Idaho National Laboratory Advanced Test Reactor," 9th International Temperature Symposium, INL/CON-11-22549, (Mar. 2012) 9 pages.

\* cited by examiner

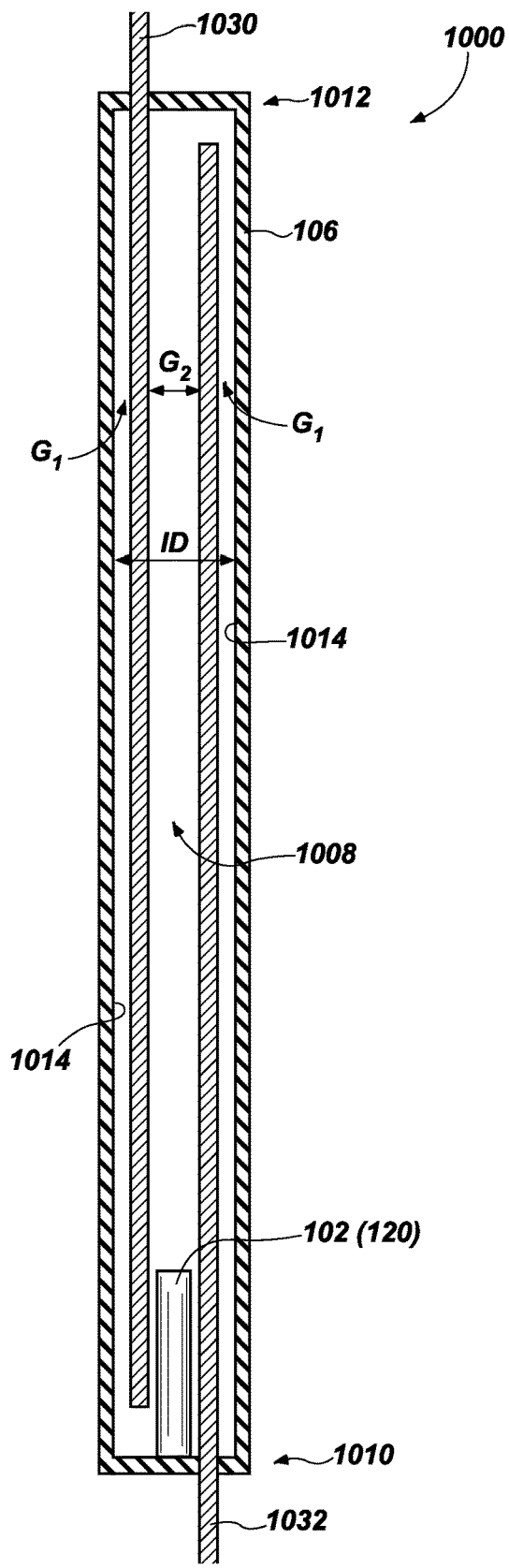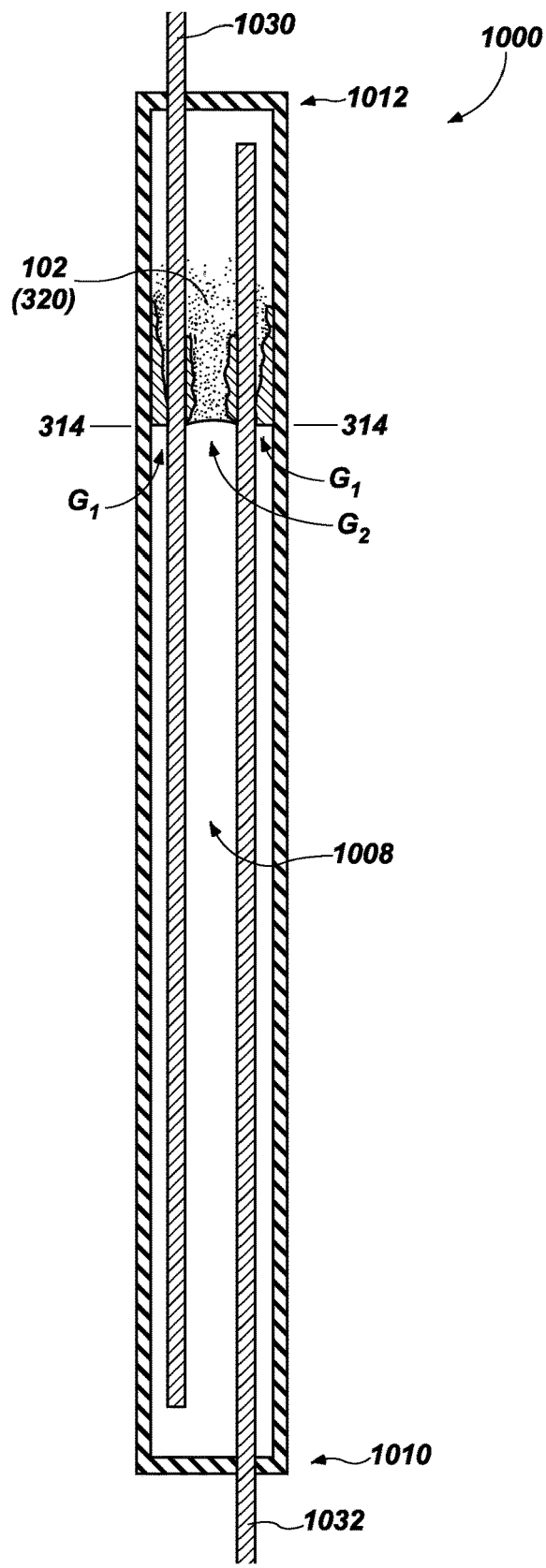
FIG. 10                    FIG. 11

TEMPERATURE LOCALE SENSORS AND RELATED METHODS

STATEMENT REGARDING FEDERALLY SPONSORED RESEARCH OR DEVELOPMENT

This invention was made with government support under Contract Number DE-AC07-05-ID14517 awarded by the United States Department of Energy. The government has certain rights in the invention.

FIELD

The disclosure, in various embodiments, relates generally to temperature sensors. More particularly, the disclosure relates to temperature sensors, and related methods, that use material gas-to-solid (e.g., deposition) phase change to identify, within an environment, the location of a particular, preset temperature.

BACKGROUND

Conventional temperature sensors generally seek to measure the temperature of a predetermined location. For example, to measure the temperature of a refrigerator, a thermometer is placed at a select location within the refrigerator, e.g., on a top shelf, and the thermometer measures the temperature at that top-shelf location. One may assume that the temperature on the bottom shelf is the same or close to the temperature measured on the top shelf; but, without a second thermometer placed on the bottom shelf, the assumption may be inaccurate. Thus, the common thermometer is a type of pointwise (e.g., "temperature-by-location") sensor. Other such temperature sensors within this category include conventional thermocouples and melt wire sensors.

Thermocouples are electrical devices that detect temperature changes in the form of changes in voltage—measured at the tip of wires that together form a junction—and output corresponding temperatures. With a thermocouple, one can detect the temperature of a select location, i.e., the location at which the user placed the thermocouple's temperature-sensitive tip. However, a thermocouple must be adequately calibrated before use to ensure accurate readings. Improper calibration leads to inaccurate temperature readings. And, thermocouple readings may become further inaccurate (e.g., may suffer from "drift") if the materials of the thermocouple's sensors become damaged, such as by bombardment of neutrons in a nuclear reactor. So, thermocouples may determine a particular temperature of a select location; but, the thermocouple is vulnerable to inaccuracies if damaged or improperly calibrated.

Melt wire sensors include metallic wires of known compositions having predetermined melting temperatures. When the melt wire sensor is placed into a hot environment, then later observed after cooling, the physical transformation of one or more of the metallic wires—from a preformed, solid shape to a melted (and, in turn, re-solidified) shape—indicates that the hot environment at least reached the melting temperature of the deformed metallic material having the highest melting temperature of all of the deformed metallic wires within the sensor. Thus, it can be determined that, at the location of the sensor, the maximum temperature of the environment reached somewhere between the highest melting temperature of the deformed metallic wires and the lowest melting temperature of the unchanged (i.e., not melted) metallic wires. Therefore, melt wire sensors can determine a range for the maximum temperature; but, the sensors do not precisely determine the maximum temperature itself. The melt wire sensors also do not precisely determine the location of the maximum temperature, but rather the pointwise range of local temperature.

Aside from determining a particular temperature, or temperature range, of a select location within an environment, conventional pointwise sensors are not well configured to allow one to accurately and precisely identify a maximum or minimum temperature's location within the environment. They are also not well configured to accurately and precisely identify where, in the environment, a particular, predetermined temperature was reached.

Consider, for example, a plurality of pointwise sensors (e.g., thermocouples) positioned within an environment, each sensor being placed at a different select location. A first conventional thermocouple may measure a temperature of 85° C. at location X within the environment; a second conventional thermocouple may measure a temperature of 100° C. at location X+2 cm; a third may measure 90° C. at location X+4 cm; and a fourth may measure 80° C. at location X+6 cm. These measurements would indicate that the maximum temperature of the environment was 100° C. at location X+2 cm (i.e., the maximum read temperature and its corresponding select location). The measurements may also indicate, by interpolation, that a temperature of 95° C. was reached at location X+3 cm (i.e., half way between the 100° C. reading at location X+2 cm and the 90° C. reading at location X+4 cm). However, these conclusions may not be accurate because they require assumptions and interpolations. In actuality, it could be that the maximum temperature was 110° C., perhaps at a location of X+1 cm or X+2.5 cm, where no thermocouples were placed. And, it could actually be that the temperature of 95° C. was reached at location X+2.2 cm, rather than exactly halfway between location X+2 cm and X+4 cm. Thus, conventional pointwise sensors may have less-than-desired accuracy and precision.

BRIEF SUMMARY

Disclosed is a temperature sensor comprising an enclosure defining a sealed volume at a known pressure. The temperature sensor also comprises a phase-change material within the sealed volume. The phase-change material is formulated to change from a gaseous phase to a solid phase, without condensing to a liquid phase, at the known pressure and a predetermined deposition temperature.

Also disclosed is a method of forming a temperature sensor. The method comprises enclosing a phase-change material within a sealed volume at a known pressure. The phase-change material is formulated to exhibit a gas-to-solid phase change at the known pressure and a predetermined deposition temperature.

In addition, disclosed is a method for using a temperature sensor to determine a location of a predetermined temperature within an environment, the method comprising disposing, within the environment, a sealed volume defining therein a known pressure, the sealed volume comprising a phase-change material having, at the known pressure, a deposition temperature equal to the predetermined temperature. With the phase-change material at least partially in a gaseous phase, and not in a liquid phase, maintaining the sealed volume within the environment as the phase-change material changes from the gaseous phase to a solid phase, forming solid grain deposits within the sealed volume. The method also includes measuring a location of the solid grain deposits to determine the location of the predetermined temperature.

Moreover, disclosed is a method of using a temperature sensor to determine a location of a maximum temperature within an environment. The method comprises providing a temperature sensor comprising a solid mass of a phase-change material within a sealed volume at a known pressure, the solid mass disposed in a central portion of the temperature sensor. The temperature sensor is then disposed within the environment, and the solid mass is exposed to a temperature greater than a sublimation temperature of the phase-change material. Within the environment, distal ends of the temperature sensor are exposed to temperatures equal to or less than a deposition temperature of the phase-change material to deposit solid grains of the phase-change material within the sealed volume proximate each of the distal ends of the temperature sensor. A mid-point, between the solid grains, is measured to determine the location of the maximum temperature within the environment.

BRIEF DESCRIPTION OF THE DRAWINGS

FIGS. 1 through 3 illustrate, in elevation view, a temperature sensor, according to an embodiment of the disclosure, horizontally disposed within a heating structure illustrated in cross section, wherein FIGS. 1 through 3 illustrate various stages in a method of using the temperature sensor, according to a method embodiment of the disclosure. FIGS. 1 through 3, if rotated ninety degrees counterclockwise, equally illustrate, in elevation view, the temperature sensor, according to an embodiment of the disclosure, vertically disposed within a heating structure.

FIGS. 4 through 6 illustrate, in elevation view, a temperature sensor, according to an embodiment of the disclosure, horizontally disposed within a heating structure (not shown), wherein FIGS. 4 through 6 illustrate various stages in a method of using the temperature sensor, according to a method embodiment of the disclosure. FIGS. 4 through 6, if rotated ninety degrees counterclockwise, equally illustrated, in elevation view, the temperature sensor, according to an embodiment of the disclosure, vertically disposed within a heating structure (not shown).

FIG. 7A, if rotated ninety degrees counterclockwise, equally illustrates, in elevation view, the plurality of temperature sensors, according to an embodiment of the disclosure, vertically disposed within a heating structure.

FIGS. 8 and 9 illustrate, in elevation view, a temperature sensor with a plurality of phase-change materials, according to an embodiment of the disclosure, horizontally disposed within a heating structure (not shown), wherein FIGS. 8 and 9 illustrate various stages in a method of using the temperature sensor, according to a method embodiment of the disclosure. FIGS. 8 and 9, if rotated ninety degrees counterclockwise, equally illustrate, in elevation view, the temperature sensor with the plurality of phase-change materials, according to an embodiment of the disclosure, vertically disposed within a heating structure (not shown).

FIGS. 10 and 11 illustrate, in elevation view, a temperature sensor with electrodes, according to an embodiment of the disclosure, the sensor being vertically disposed within a heating structure (not shown), wherein FIGS. 10 and 11 illustrate various stages in a method of using the temperature sensor, according to a method embodiment of the disclosure. FIGS. 10 and 11, if rotated ninety degrees clockwise, equally illustrate, in elevation view, the temperature sensor with electrodes, according to an embodiment of the disclosure, horizontally disposed within a heating structure (not shown).

FIGS. 12 and 13 illustrate, in elevation view, a temperature sensor with sublimatable electrodes, according to an embodiment of the disclosure, the sensor being vertically disposed within a heating structure (not shown), wherein FIGS. 12 and 13 illustrate various stages in a method of using the temperature sensor, according to a method embodiment of the disclosure. FIGS. 12 and 13, if rotated ninety degrees clockwise, equally illustrate, in elevation view, the temperature sensor with sublimatable electrodes, according to an embodiment of the disclosure, horizontally disposed within a heating structure (not shown).

DETAILED DESCRIPTION

Figure 1:
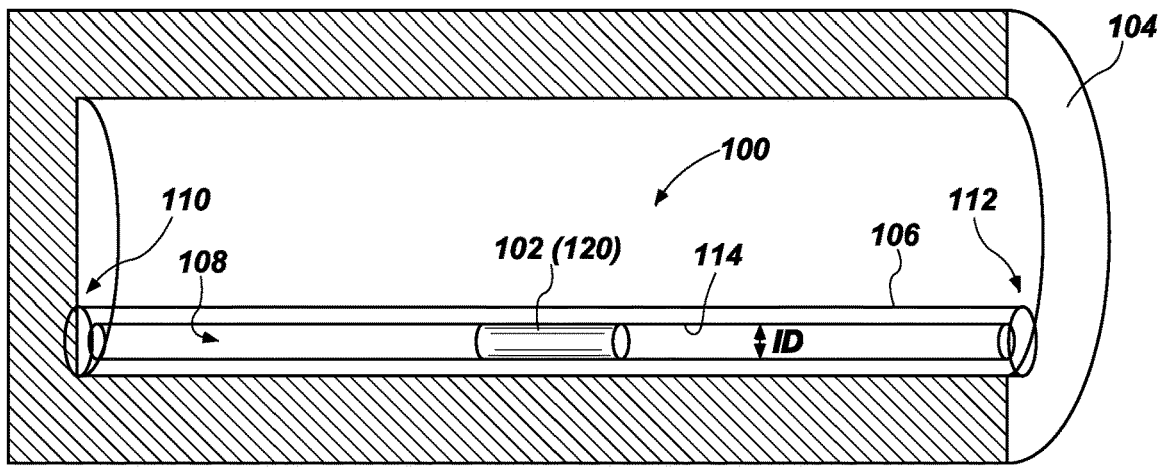

The sensors and methods, according to embodiments of the disclosure, enable precise and accurate identification of the location of a select temperature within an environment and, in some embodiments, of a location of a maximum temperature of the environment. The disclosed temperature sensors are therefore characterized herein as temperature "locale" sensors, in contrast to conventional "pointwise" temperature sensors. The disclosed sensors rely upon well characterized gas-to-solid phase-change properties of materials to precisely and accurately identify the location, within an environment, of the materials' known gas-to-solid deposition temperatures.

As used herein, the term "deposition temperature" means and refers to the temperature at which a material, at a given pressure, begins to undergo a direct gaseous-to-solid phase change (i.e., "deposition"). The reverse of the direct gaseous-to-solid phase change is the direct solid-to-gaseous phase change (i.e., "sublimation"). For a given pressure, a material's deposition and sublimation occur, in equilibrium, at the deposition temperature. At the given pressure, sublimation of the material occurs as temperatures rise above the deposition temperature; contrarily, at the given pressure, deposition of the material occurs as temperatures lower below the deposition temperature. Therefore, the terms "deposition temperature," "sublimation temperature," "sublimation/deposition temperature," and "deposition/sublimation temperature" may be used interchangeably.

As used herein, the term "high-purity," when referring to a material, refers to that material comprising at least 99 at. % (e.g., at least 99.9 at. %) of the element or compound in question.

As used herein, the terms "about" and "approximately," when either is used in reference to a numerical value for a particular parameter, are inclusive of the numerical value and a degree of variance from the numerical value that one of ordinary skill in the art would understand is within acceptable tolerances for the particular parameter. For example, "about" or "approximately," in reference to a numerical value, may include additional numerical values within a range of from 90.0 percent to 110.0 percent of the numerical value, such as within a range of from 95.0 percent to 105.0 percent of the numerical value, within a range of from 97.5 percent to 102.5 percent of the numerical value, within a range of from 99.0 percent to 101.0 percent of the numerical value, within a range of from 99.5 percent to 100.5 percent of the numerical value, or within a range of from 99.9 percent to 100.1 percent of the numerical value.

As used herein, the terms "comprises," "comprising," "includes," and/or "including" specify the presence of stated materials, elements, and/or isotopes, but do not preclude the presence or addition of one or more other materials, elements, and/or isotopes thereof.

As used herein, "and/or" includes any and all combinations of one or more of the associated listed items.

As used herein, the singular forms "a," "an," and "the" are intended to include the plural forms as well, unless the context clearly indicates otherwise.

The following description provides specific details, such as material types, in order to provide a thorough description of embodiments of the disclosed sensors and methods. However, a person of ordinary skill in the art will understand that the embodiments of the sensors and methods may be practiced without employing these specific details. Indeed, the embodiments of the sensors and methods may be practiced in conjunction with conventional techniques employed in the industry.

The processes described herein do not form a complete process flow for the related methods. The remainder of the methods are known to those of ordinary skill in the art. Accordingly, only the methods and conditions necessary to understand embodiments of the present materials and methods are described herein.

The illustrations presented herein are not meant to be actual views of any particular sensor component or environment, but are merely idealized representations that are employed to describe embodiments of the disclosure.

Reference will now be made to the drawings, wherein like numerals refer to like components throughout. The drawings are not necessarily drawn to scale.

Figure 2:
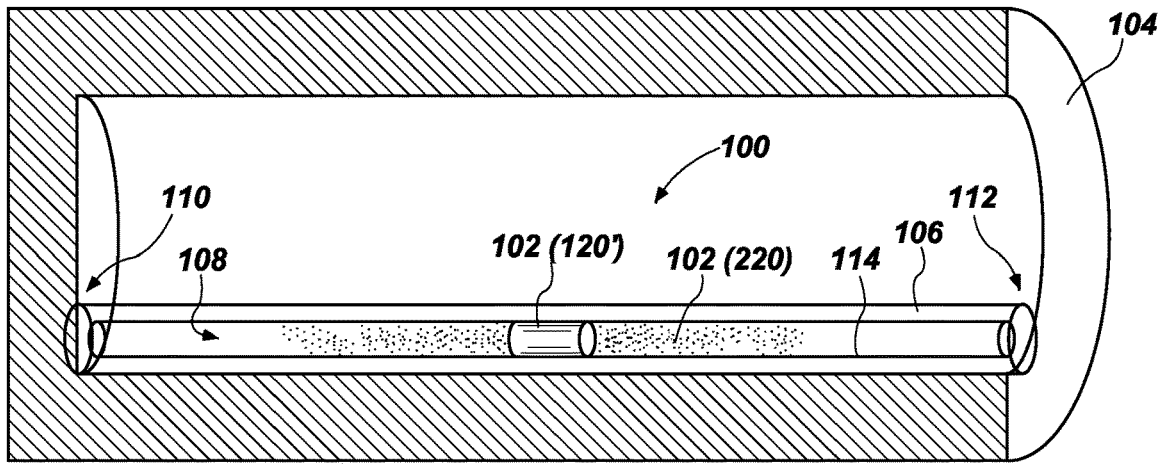
Figure 3:
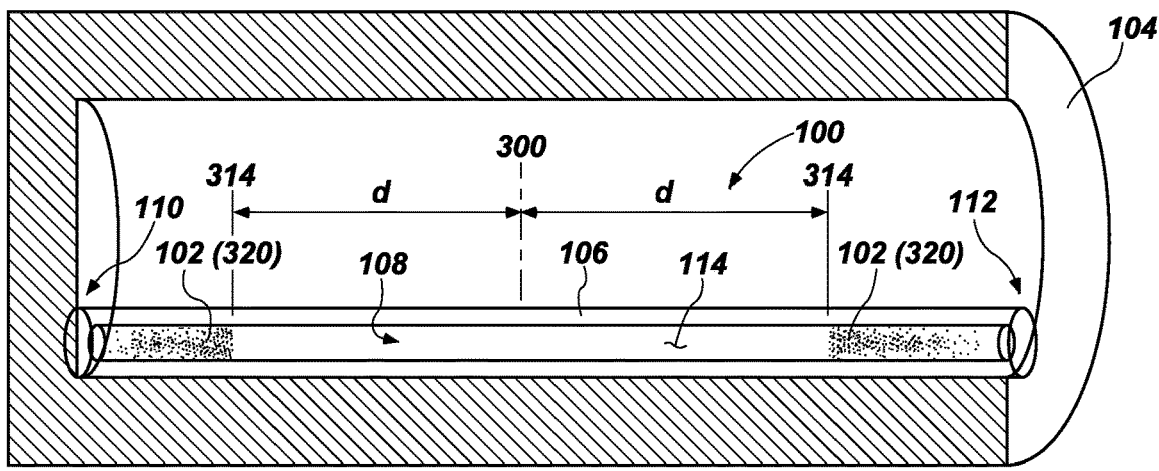

With reference to FIGS. 1 through 3, illustrated is a temperature sensor 100 according an embodiment of the disclosure. The temperature sensor 100 is configured as a temperature locale sensor and depends upon known gas-to-solid phase change properties of a phase-change material 102 to identify, within an environment (e.g., within a furnace 104), the location of the phase-change material's 102 known gaseous-to-solid deposition temperature.

The temperature sensor 100 includes an enclosure 106 (e.g., a tube) defining therein a sealed volume 108. The enclosure 106 may be formed of a translucent material (e.g., translucent quartz, translucent sapphire) to enable visual access to the sealed volume 108 within. The material forming the enclosure 106 may be selected to withstand the anticipated temperatures of the environment (e.g., the furnace 104) to be monitored.

The temperature sensor 100 may be formed to fix the pressure within the sealed volume 108 with the pressure being a predetermined, desired pressure. Thus, the pressure within the enclosure 106 is a "known" pressure. The pressure may be selected, and the sealed volume 108, configured to ensure the pressure of the sealed volume 108 is maintained below the triple point of the phase-change material 102. In some embodiments, the pressure within the sealed volume 108 may be minimized; thus, the enclosure 106 and sealed volume 108 may constitute a "vacuum tube." For example, the pressure within the sealed volume 108, when the temperature sensor 100 is first formed and prior to use of the temperature sensor 100, may be less than about 0.01 Torr (less than about 1.33 Pa).

To maintain the integrity of the controlled pressure within the sealed volume 108, ends (e.g., first end 110 and second end 112) of the enclosure 106 may be "permanently" sealed such that opening the enclosure 106 to access the sealed volume 108 would necessitate breaking the material of the enclosure 106.

In other embodiments, the enclosure 106 may be sealable, e.g., with stoppers (not shown) at each of the first end 110 and second end 112 so that the sealed volume 108 could be unsealed, accessed, and then resealed by removing and replacing the stoppers, respectively. Nonetheless, the pressure within the sealed volume 108 may be controlled so that, upon sealing the sealed volume 108 within the enclosure 106, the interior pressure is at a known, desired pressure.

The enclosure 106 may be relatively small (e.g., with an interior transverse dimension (e.g., an interior diameter (ID)))—defined by an interior surface 114 of the enclosure 106—of less than about one centimeter (e.g., less than about 1 cm).

The phase-change material 102 is enclosed within the sealed volume 108, inside the enclosure 106 and at the known pressure. In some embodiments, prior to use of the temperature sensor 100, the phase-change material 102 may be initially in solid form, such as in a solid mass 120 (e.g., a unitary piece, a length of wire).

The composition of the phase-change material 102 is predetermined and known. And, the phase-change characteristics of the phase-change material 102 are also predetermined and known. That is, the phase-change material 102 and the pressure within the sealed volume 108 will be selected so that the phase-change material's 102 gaseous-to-solid (i.e., deposition) temperature is a predetermined "known."

As is known in the art, a substance may be studied to determine, for any given pressure, the temperature at which the substance will transition from solid to liquid (i.e., "melt"), transition from liquid to solid (i.e., "freeze"), transition from liquid to gas (i.e., "vaporize"), transition from gas to liquid (i.e., "condense"), and—for at least some substances—transition from solid directly to gas (i.e., "sublimate") and transition from gas directly to solid (i.e., "deposit"). The phase-change material 102 of the temperature sensor 100 is selected so that it will assuredly change from the gaseous phase to the solid phase, without first condensing to a liquid phase, at a known temperature (i.e., the "deposition temperature") for a predefined pressure. Likewise, the phase-change material 102 may be selected (e.g., formulated) so it will sublimate (transition from solid directly to gas) without first melting to a liquid phase, at another known temperature (i.e., the "sublimation temperature").

In some embodiments, the phase-change material 102 may consist of a high-purity element (e.g., high-purity zinc (Zn), high-purity tellurium (Te), high-purity antimony (Sb)) or a high-purity chemical alloy or other compound. For example, in some embodiments, the phase-change material 102 may be selected from the group consisting of Zn, Te, and Sb. However, it is contemplated that any material having known sublimation/deposition properties may be used as the phase-change material 102.

With the phase-change properties—and particularly at least the deposition temperature—of the phase-change material 102 known from previous characterization, and with the pressure of the sealed volume 108 controlled by the enclosure's 106 sealing of the sealed volume 108, the location of the deposition temperature may be detected using the temperature sensor 100, according to method embodiments of this disclosure.

With continued reference to FIG. 1, the temperature sensor 100 may be placed within an environment to be monitored, such as the furnace 104, which is illustrated in cross-section in the interest of visibility. In some embodiments, the furnace 104 (or other environment) may be horizontally disposed, and the temperature sensor 100 may be horizontally disposed within the furnace 104. In other embodiments, the environment (e.g., a reactor) may be vertically disposed or disposed at an angel, and the temperature sensor 100 inserted vertically or at an angle, respectively. In still other embodiments, the temperature sensor 100 may be arranged perpendicular or angularly to the arrangement of the environment (e.g., the temperature sensor 100 may be vertically arranged in a horizontally-arranged furnace; the temperature sensor 100 may be horizontally arranged in a vertically-arranged reactor).

With reference to FIG. 2, as the environment (e.g., the furnace 104) warms and passes the sublimation temperature of phase-change material 102, the phase-change material 102 will, predictably, begin to sublimate—provided the temperature sensor 100 is positioned to dispose the phase-change material 102 within the sufficiently heated region of the environment (e.g., the furnace 104). Gaseous portions 220 of the phase-change material 102 will move into open areas of the sealed volume 108, expanding away from the remaining solid mass 120' of the phase-change material 102.

Provided that the heat within the environment is such that it is at a maximum temperature in a somewhat central region and at minimum temperatures at more distal regions, the gaseous portions 220 of the phase-change material 102 will move away from the hottest region of the environment (e.g., a maximum temperature location 300 of the heat region in the furnace 104) and begin to cool as the phase-change material 102 fills the sealed volume 108. Eventually, the gaseous portions 220 may eventually travel to space within the sealed volume 108 that is at or below the deposition temperature of the phase-change material 102. Turning to FIG. 3, then, at a location that is at the deposition temperature—i.e., at a "deposition location" 314—the phase-change material 102 transitions from the gaseous phase into solid phase, depositing on the interior surface 114 of the enclosure 106 in the form of, e.g., solid grains 320. The deposition locations 314 thus mark the precise location of the known deposition temperature within the environment (e.g., the furnace 104).

The deposited solid grains 320 may deposit over a region of the interior surface 114. However, it is contemplated that the solid grains 320 will most densely form at the first-encountered location that is at or below the deposition temperature, forming an observable boundary along the deposition location 314, as illustrated in FIG. 3. Therefore, clearly identifying the deposition location 314, and thus the precise location of the known deposition temperature, is enabled.

In some embodiments, use of the temperature sensor 100 may also enable identification of the location of the maximum temperature of the environment (e.g., the furnace 104). For example, in embodiments in which the solid mass 120 (FIG. 1) of the phase-change material 102 was initially positioned within a central area of the enclosure 106, space of the sealed volume 108 adjacent the first end 110 and the second end 112 of the temperature sensor 100 may be initially empty (e.g., devoid of solid material). Thus, sublimation of the phase-change material 102 may cause travel of the gaseous material into the once-empty regions, leading to eventual deposition of solid grains 320 (FIG. 3) adjacent each of the first end 110 and the second end 112. The midway point between the resulting two deposition locations 314 indicates the maximum temperature location 300.

As illustrated in FIG. 3, each of the two deposition locations 314 is a distance d from the maximum temperature location 300. Notably, it is possible to identify the maximum temperature location 300 of the environment using just one of the temperature sensors 100 with a single phase-change material 102, provided the temperature sensor 100 is configured to allow dual-end solid grains 320 deposition.

Accordingly, disclosed is a temperature sensor comprising an enclosure defining a sealed volume at a known pressure. The temperature sensor also comprises a phase-change material within the sealed volume. The phase-change material is formulated to change from a gaseous phase to a solid phase, without condensing to a liquid phase, at the known pressure and a predetermined deposition temperature.

Also disclosed is a method of forming a temperature sensor. The method comprises enclosing a phase-change material within a sealed volume at a known pressure. The phase-change material is formulated to exhibit a gas-to-solid phase change at the known pressure and a predetermined deposition temperature.

Additionally, disclosed is a method for using a temperature sensor to determine a location of a predetermined temperature within an environment, the method comprising disposing, within the environment, a sealed volume defining therein a known pressure, the sealed volume comprising a phase-change material having, at the known pressure, a deposition temperature equal to the predetermined temperature. With the phase-change material at least partially in a gaseous phase, and not in a liquid phase, retaining the sealed volume within the environment as the phase-change material changes from the gaseous phase to a solid phase, forming solid grain deposits within the sealed volume. The method also includes measuring a location of the solid grain deposits to determine the location of the predetermined temperature.

Moreover, disclosed is a method of using a temperature sensor to determine a location of a maximum temperature within an environment. The method comprises providing a temperature sensor comprising a solid mass of a phase-change material within a sealed volume at a known pressure, the solid mass disposed in a central portion of the temperature sensor. The temperature sensor is then disposed within the environment, and the solid mass is exposed to a temperature greater than a sublimation temperature of the phase-change material. Within the environment, distal ends of the temperature sensor are exposed to temperatures equal to or less than a deposition temperature of the phase-change material to deposit solid grains of the phase-change material within the sealed volume proximate each of the distal ends of the temperature sensor. A mid-point, between the solid grains, is measured to determine the location of the maximum temperature within the environment.

Figure 4:
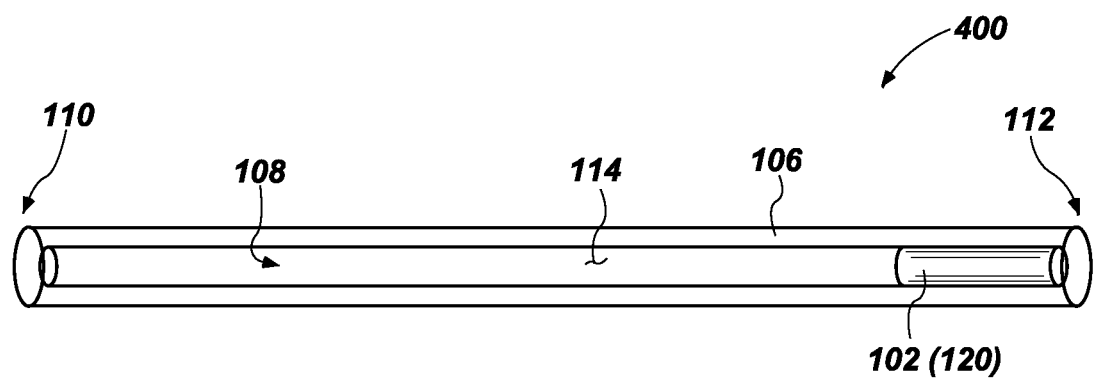
Figure 5:
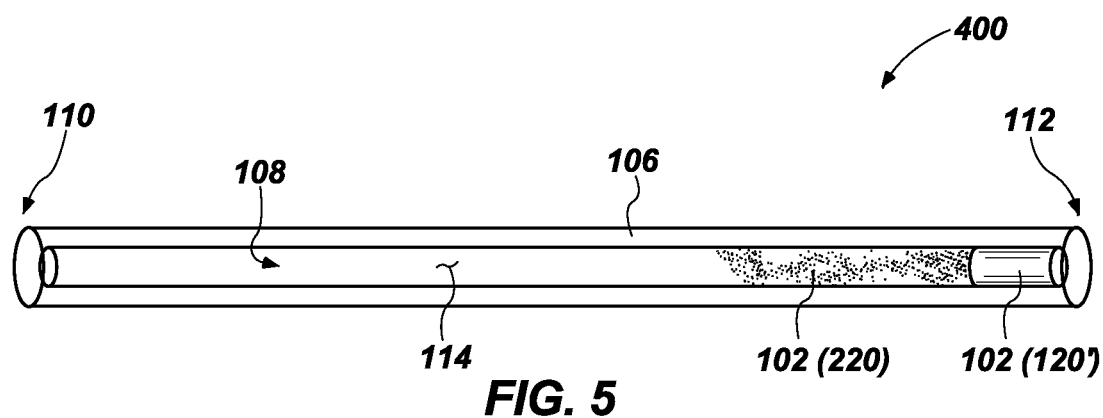
Figure 6:
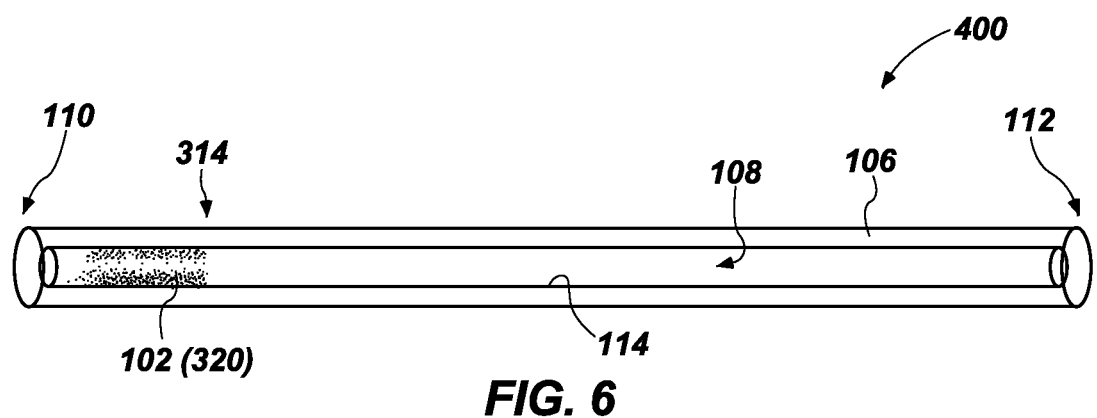

With reference to FIGS. 4 through 6, another embodiment of a temperature sensor 400 is illustrated. In this temperature sensor 400, the phase-change material 102 may initially be disposed adjacent one of the first end 110 and the second end 112. For example, the solid mass 120 of the phase-change material 102 may be initially disposed, within the sealed volume 108, adjacent the second end 112, as illustrated in FIG. 4. When the temperature sensor 400 is positioned within an environment (e.g., the furnace 104 of FIGS. 1 through 3) so as to expose the second end 112 of the enclosure 106 and the phase-change material 102 therein to temperatures exceeding the sublimation temperature of the phase-change material 102, the phase-change material 102 will sublimate, as illustrated in FIG. 5. The gaseous portion 220 will begin to fill the sealed volume 108, moving toward the first end 110, which may be disposed in a cooler region of the environment. Once the gaseous portion 220 reaches a region of the sealed volume 108 that is at the deposition temperature or lower, the gaseous portion 220 will deposit as the solid grains 320, providing a precise, visual indication of the deposition location 314, as illustrated in FIG. 6.

Because the temperature sensor 400 of FIGS. 4 through 6 enables one-sided formation of the solid grains 320, and therefore indicates only one deposition location 314, this one-sided temperature sensor 400 with a single phase-change material 102 may not be as readily configured as a dual-sided temperature sensor (e.g., the temperature sensor 100 of FIGS. 1 through 3) to indicate the maximum temperature location 300 as in FIG. 3.

Figure 7A:
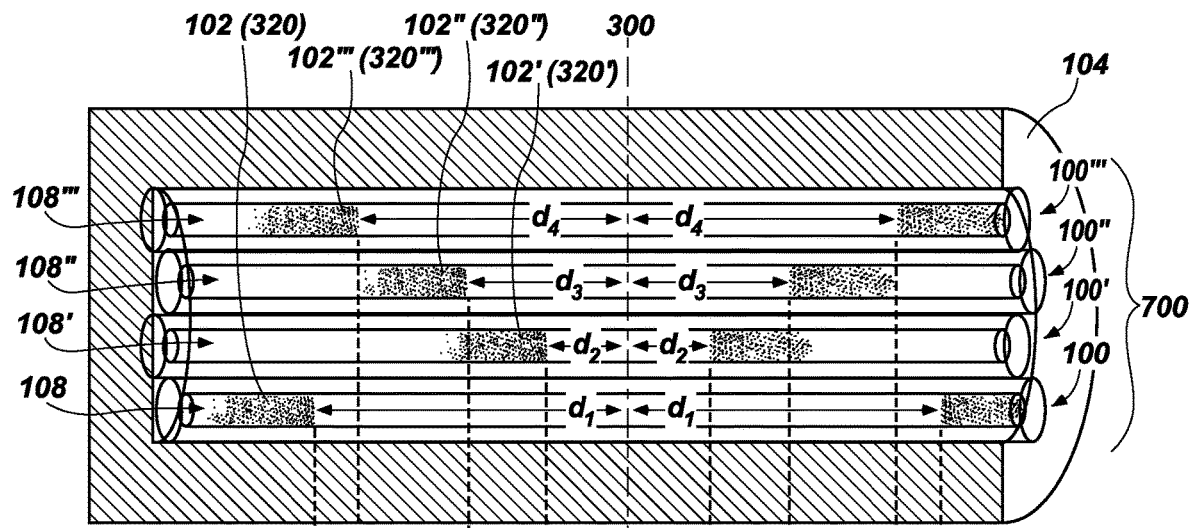
FIG. 7A illustrates, in elevation view, a plurality of temperature sensors, according to an embodiment of the disclosure, horizontally disposed within a heating structure illustrated in cross section and post deposition of previously sublimated materials, according to a method embodiment of the disclosure.
Figure 7B:
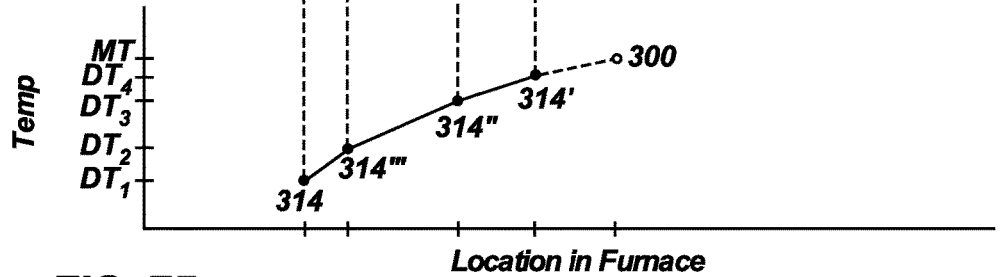
FIG. 7B is a graph plotting the distance versus temperature of the measurements indicated by the temperature sensors of FIG. 7A.

With reference to FIGS. 7A and 7B, illustrated is another embodiment of a method for using the disclosed temperature locale sensors, namely, using a plurality 700 of temperature sensors 100, 100', 100", 100'". The plurality 700 may include the temperature sensor 100 described above with respect to FIGS. 1 through 3 along with additional temperature sensors 100', 100", 100'" structured and constructed in a similar manner as the above-described temperature sensor 100. However, all or some of the temperature sensors 100, 100', 100", 100'" of the plurality 700 may be tailored to identify the location of a different deposition temperature.

Tailoring the plurality 700 of temperature sensors 100, 100', 100", 100'" to target different deposition temperatures may, in some embodiments, include selecting the respective phase-change materials 102, 102', 102", 102'" to comprise, consist essentially of, or consist of the same composition but with different pressures in the sealed volumes 108, 108', 108", 108'". In other embodiments, the respective phase-change materials 102, 102', 102", 102'" may have different compositions and the same pressures in the sealed volumes 108, 108', 108", 108'" with different known deposition temperatures. In still other embodiments, none of the phase-change materials 102, 102', 102", 102'" may have the same composition and none of the pressures in the sealed volumes 108, 108', 108", 108'" may be the same, but the respective deposition temperatures to which each is tailored may nonetheless be unique in the plurality 700. In yet other embodiments, multiple sensors within the plurality 700 may be tailored for the same deposition temperature as a means of double-checking results.

With continued reference to FIG. 7A, for example, the plurality 700 of temperature sensors 100, 100', 100", 100'" may produce different deposition locations 314, 314', 314", 314'". And, where the temperature sensors 100, 100', 100", 100'" of the plurality 700 are dual-sided (i.e., configured for two-ended solid grains 320, 320', 320", 320'" depositions, as in FIG. 7A), each of the temperature sensors 100, 100', 100", 100'" may indicate the maximum temperature location 300 as the mid-point between the respective different deposition locations 314, 314', 314", 314'". Thus, the maximum temperature location 300 is a distance $d_1$ from each of the deposition locations 314 of the temperature sensor 100, a distance $d_2$ from each of the deposition locations 314' of a second temperature sensor 100', a distance $d_3$ from each of the deposition locations 314" of a third temperature sensor 100", and a distance $d_4$ from each of the deposition locations 314'" of a fourth temperature sensor 100'".

While the plurality 700 of FIG. 7A shows the temperature sensors 100, 100', 100", 100'" as extending essentially across an entire height of the furnace 104, the plurality 700 could be evenly spaced along the circumference of the furnace 104 or clustered in only one radial area of the furnace 104. In still other embodiments, some of the temperature sensors 100, 100', 100", 100'" may be positioned horizontally adjacent one another, along the length of the furnace 104.

With reference to FIG. 7B, the locations of the respective deposition locations 314, 314', 314", 314'" have been plotted against the respective deposition temperature that each of the temperature sensors 100, 100', 100", 100'" was configured to target. For example, temperature sensor 100 was constructed (i.e., the phase-change material 102 was formulated and selected, and the pressure of the sealed volume 108 was selected and controlled) to target deposition temperature $DT_1$, the second temperature sensor 100' was constructed to target deposition temperature $DT_4$, the third temperature sensor 100" was constructed to target deposition temperature $DT_3$, and the fourth temperature sensor 100" was constructed to target deposition temperature $DT_2$. This plot of location-in-furnace vs. temperature graphically provides an accurate temperature profile of the furnace 104 environment.

It is contemplated that the maximum temperature MT of the environment (e.g., of the furnace 104), i.e., the temperature at the maximum temperature location 300, may be extrapolated from the temperature profile. Notably, extrapolation of the maximum temperature MT is enabled because the plurality 700 of temperature sensors 100, 100', 100", 100'" can identify the maximum temperature location precisely. If confirmation of the extrapolated maximum temperature MT is wanted, a pointwise temperature sensor could then be positioned at the maximum temperature location 300 to read the temperature in another test. In contrast, conventional pointwise temperature sensors systems, even using a plurality of such sensors, would have to guess and check the location of the maximum temperature, or make assumptions and interpolate between two high-read temperatures, to make some sort of determination as to the location and temperature of the hottest portion of the furnace 104.

While FIG. 7B plots only one side of the location-in-furnace versus temperatures, it should be recognized that, because the temperature sensors 100, 100', 100", 100'" are configured for dual-end depositions, the locations of the furnace 104 to the right of the maximum temperature location 300 could likewise be plotted to show a more extensive temperature profile, including both the rise and fall of temperatures along the length of the furnace 104.

It is also contemplated that grain size of the solid grains 320, 320', 320", 320'" may be directly related to the maximum temperature MT of the environment (e.g., of the furnace 104). For example, it is contemplated that a higher maximum temperature MT may correlate to a greater grain size along the deposition locations 314, 314', 314", 314'", while a lower maximum temperature MT may correlate to a smaller grain size. Therefore, determination of the grain sizes may enable determination of the maximum temperature MT even without extrapolating from the temperature profile.

Figure 8:
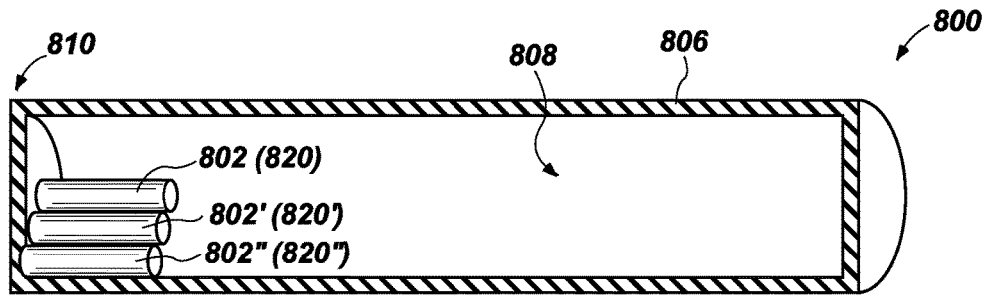
Figure 9:
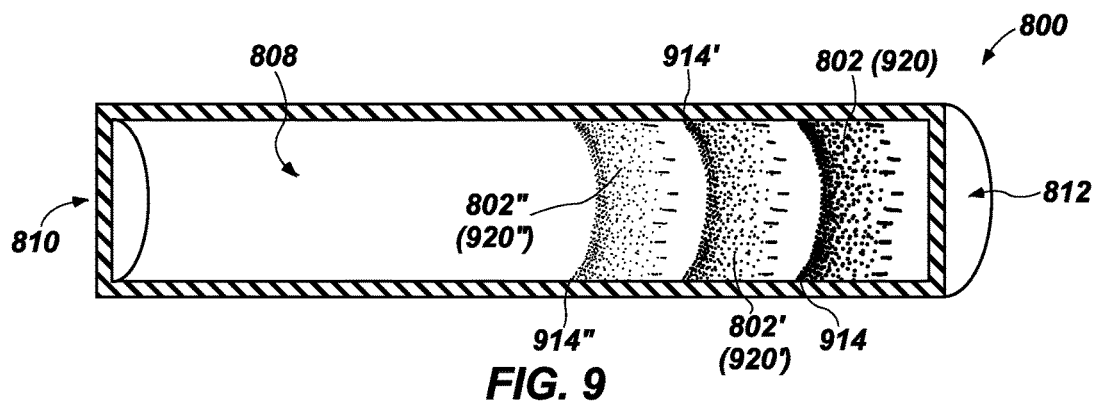

With reference to FIGS. 8 and 9, a temperature sensor 800 may alternatively include multiple phase-change materials 802, 802', 802" within a sealed volume 808 of an enclosure 806. In the shared space, each of the phase-change materials 802, 802', 802" will be at a same pressure as the others, but the different compositions of the materials may target different deposition temperatures. Thus, after sublimation and deposition to form solid grains 920, 920', 920", separate deposition locations 914, 914', 914" may be distinguishable to precisely identify the respective location of the deposition temperature of each of the phase-change material 802, 802', 802", as illustrated in FIG. 9.

While FIGS. 8 and 9 illustrated this temperature sensor 800 with multiple phase-change materials 802, 802', 802" as configured for one-end deposition, with solid masses 820, 820', 820" initially adjacent a first end 810 of the temperature sensor 800 and with the deposition locations 914, 914', 914" adjacent a second end 812 of the temperature sensor 800, in other embodiments, the temperature sensor 800 may be configured for dual-end deposition, similar to that of FIGS. 1 through 3 and FIG. 7A, to enable identification of the maximum temperature location 300 (FIG. 7A).

With reference to FIGS. 10 and 11, in some embodiments, a temperature sensor 1000 may enable electrical monitoring of the deposition of the phase-change material 102. The temperature sensor 1000 may include a first electrode 1030 and a second electrode 1032 initially not in physical contact or electrical communication with one another. The first electrode 1030 may extend into the sealed volume 1008 through a top end 1012 of an enclosure 1006, and the second electrode 1032 may extend into the sealed volume 1008 through a bottom end 1010 of the enclosure 1006. Initially, the first electrode 1030 and the second electrode 1032 may each be spaced from an interior surface 1014 of the enclosure 1006 by a gap $G_1$ and may be spaced from one another by a gap $G_2$. In some embodiments, the first and second electrodes 1030, 1032 may not be spaced from the interior surface 1014 but may still be spaced from one another.

The phase-change material 102, e.g., as the solid mass 120, may be initially disposed on the bottom end 1010 of the enclosure 1006. When placed in a hot environment, the phase-change material 102 sublimates to begin to fill the enclosed, sealed volume 1008, ultimately reaching the phase-change material's 102 deposition temperature adjacent the top end 1012 of the enclosure 1006 where it forms the solid grains 320 along the interior surface 1014 of the enclosure 1006 and/or along the first electrode 1030 and the second electrode 1032. A sufficient amount of the phase-change material 102 may be included in the temperature sensor 1000 to allow the solid grains 320 to substantially or completely fill at least one of the gaps $G_1$, $G_2$ and complete an electrical circuit between the first and second electrodes 1030, 1032. The completed circuit may be electrically read while the temperature sensor 1000 is in use to indicate that the deposition location 314 has been established and can be read.

In some such embodiments as that of FIGS. 10 and 11, the material of the first and second electrodes 1030, 1032 may be selected and formulated to have a sublimation temperature that is greater than the temperatures to which the temperature sensor 1000 is expected to be exposed. Thus, the first and second electrodes 1030, 1032 may be formulated to retain their solid states while the phase-change material 102 transitions to a gas (i.e., sublimates).

Figure 12:
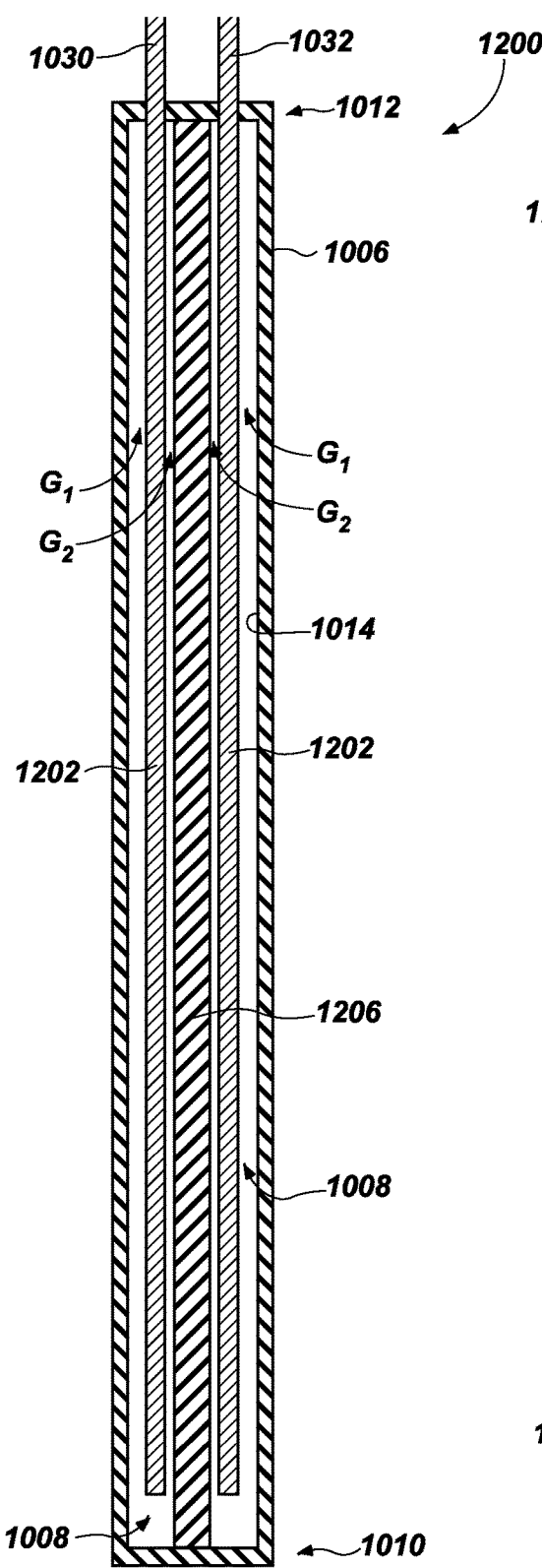
Figure 13:
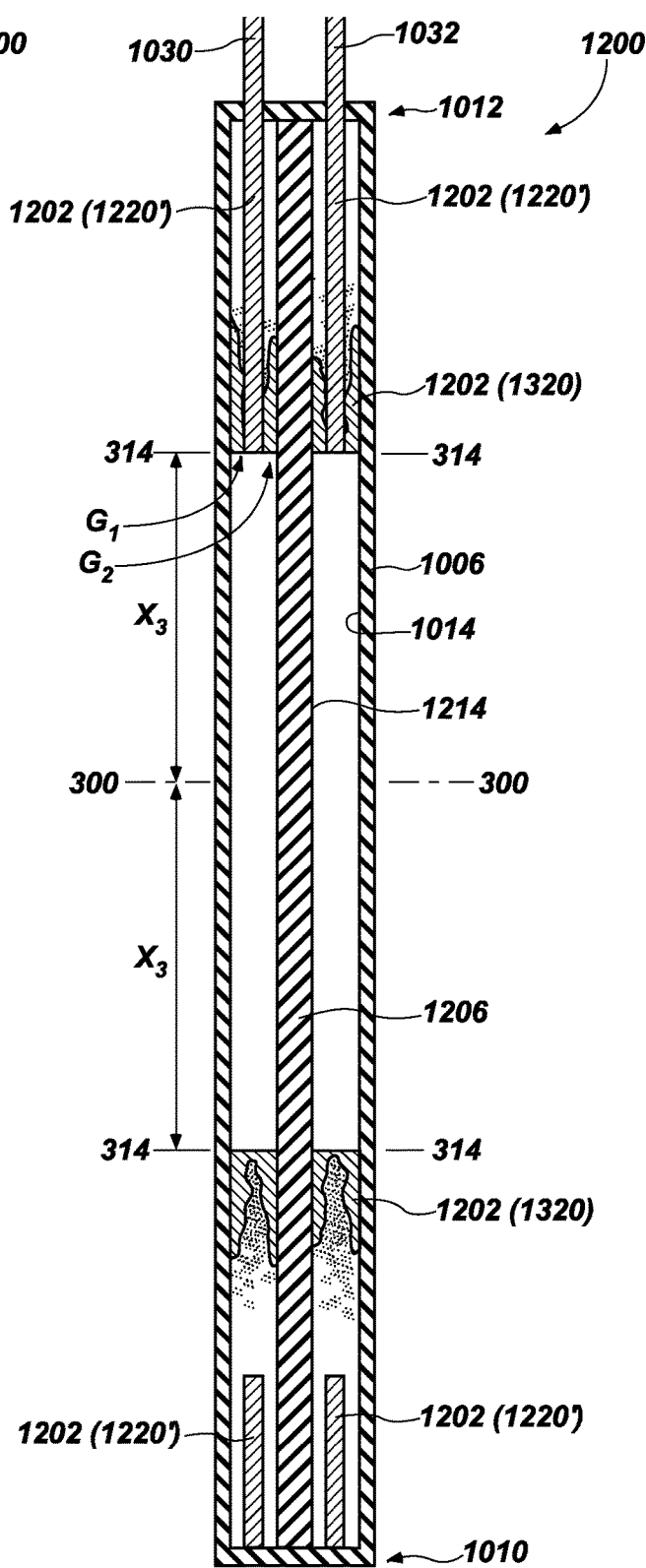

While the first and second electrodes 1030, 1032 of the temperature sensor 1000 pass into the sealed volume 1008 from opposite ends of the top and bottom ends 1012, 1010 of the enclosure 1006, in other embodiments, the first and second electrodes 1030, 1032 may pass into the sealed volume 1008 from the same end, as in the embodiment of a temperature sensor 1200 of FIGS. 12 and 13. Even so, at least initially, the first and second electrodes 1030, 1032 may not be in physical or electrical contact. To discourage premature contact between the first and second electrodes 1030, 1032, the enclosure 1006 may further include a central rod 1206 extending through a central axis of the enclosure. The central rod 1206 may be formed of the same or a different material than the material forming the outer structure of the enclosure 1006. In some embodiments, the first and second electrodes 1030, 1032 may initially be spaced from the interior surface 1014 of the enclosure 1006 by gap $G_1$ and spaced from an outer surface 1214 of the central rod 1206 by gap $G_2$.

Also, while the first and second electrodes 1030, 1032 of the temperature sensor 1000 of FIGS. 10 and 11 may be formulated to withstand the high temperatures of the environment to be measured, in other embodiments, the material of the first and second electrodes 1030, 1032 may be selected and formulated to, itself, function as a phase-change material 1202, as in the embodiment of the temperature sensor 1200 of FIGS. 12 and 13. Thus, when the temperature sensor 1200 is subjected to the high-temperature environment (e.g., the furnace 104 (FIG. 1)), the material of the first and second electrodes 1030, 1032, sublimates, at least where the temperatures of the environment exceed the sublimation temperature of the phase-change material 1202 of the first and second electrodes 1030, 1032. Solid grains 1320 of the phase-change material 1202 from the sublimated portions of the first and second electrodes 1030, 1032 may deposit to identify the deposition location 314 of the phase-change material's 1220 deposition temperature.

In implementations in which the temperature sensor 1200 is vertically disposed and only a central portion of the first and second electrodes 1030, 1032 sublimates, remnant solid portions 1220' of the first and second electrodes 1030, 1032 may fall to the bottom end 1010 of the temperature sensor 1200, as illustrated in FIG. 13, without disrupting or preventing the formation of the solid grains 1320 at the deposition locations 314. In implementations in which the temperature sensor 1200 is horizontally deposed (e.g., if the illustration of FIG. 13 were rotated ninety degrees clockwise), the remnant solid portions 1220' may fall against the interior surface 1014 (rather than to the bottom end 1010), again without disrupting or preventing the formation of solid grains 1320 at the deposition locations 314.

Again, as the phase-change material 1202 builds up in the deposition location 314, the solid grains 1320 of the phase-change material 1202 on the interior surface 1014 of the enclosure 1006, on the exterior surface 1214 of the central rod 1206, on the remnant solid portions 1220' of the first and second electrodes 1030, 1032, or a combination thereof may fill either or both of the gaps $G_1$, $G_2$ to complete an electrical connection between the remnant solid portions 1220' of the first and second electrodes 1030, 1032. Thus, again, the deposition and readiness of the temperature sensor 1200 to be read can be electrically monitored remotely from the temperature sensor 1200 and furnace 104 (FIG. 1).

While in any of the aforementioned embodiments, the material of the disclosed enclosures 106, 806, 1006 may be translucent to allow visual inspection of the formed deposition locations, in other embodiments, the material of the enclosures may be an opaque material and the deposition locations determined (and, optionally, the grain sizes measured) by cutting open the enclosures after completion of their use. Alternatively or additionally, x-ray radiography, topography, or both may be used to peer inside an otherwise opaque enclosure.

The disclosed temperature sensors may be "reset" after use to prepare the sensors to be used again. For example, after deposition of the solid grains at the deposition location, the portions of the enclosures with the deposited phase-change material may be exposed to temperatures above the sublimation temperature of the phase-change material while a "starting location" for the phase-change material is exposed to temperatures below the deposition temperature. The re-sublimated phase-change material will therefore reform (i.e., re-deposit) at the "starting location" so that the sensor can be later exposed to a heating environment in the same manner as before.

Temperature sensors configured for single-end deposition may be particularly suited for re-use even without a separate "reset." For example, returning to the embodiment of FIGS. 4 through 6, the temperature sensor 400 of FIG. 6, after the deposition to identify a first deposition location 314, may be turned end-for-end to swap the location of the first and second ends 110, 112 to effectively return the positioning of the phase-change material 102 to the position of FIG. 4 though with the phase-change material 102 in solid grain (320) form, rather than the unitary solid mass 120 form of FIG. 4.

It is contemplated that a disclosed temperature sensor, once used in a particular orientation (e.g., a horizontal orientation (e.g., in a horizontal furnace)) may be reset and then used in a different particular orientation (e.g., a vertical or angled orientation (e.g., in a vertical or angled reactor)).

It is further contemplated that one or more disclosed temperature sensors may be used in an environment at a particular orientation thereof (e.g., a horizontal, vertical, or angled orientation of the one or more sensors) while one or more other disclosed temperature sensors are used in the environment at one or more different particular orientations. Thus, one or more sensors may be horizontally oriented while one or more other sensors are vertically oriented.

It is also contemplated that one or more disclosed temperature sensors (e.g., disclosed temperature locale sensors) may be used in an environment while one or more pointwise temperature sensors are also used.

Using the temperature sensors disclosed herein, one is enabled to find a precise location for a specific, desired temperature. For example, it may be known that a particular substance exhibits a microstructure change, e.g., from body-centered-cubic structure to a face-centered-cubic structure at a particular temperature of Y° C. To promote the microstructure change, then, it may be necessary to expose the substance to the particular temperature of Y° C. Using conventional pointwise temperature sensors, one could only guess at where, in an environment, temperature Y° C. may be achieved, but would likely need to use multiple pointwise temperature sensors or make multiple readings with a single pointwise temperature sensor, to try to pinpoint the location at which Y° C., specifically, would be experienced. On the other hand, with the disclosed temperature locale sensors, a sensor may be structured and configured to particularly identify the location of the targeted Y° C. by selecting a phase-change material and pressure for the sealed volume that correspond to a deposition temperature of Y° C. A single use of such temperature locale sensor may provide the precise location of the Y° C. temperature within the environment, and the substance to be microstructurally changed may be placed at that precise location for the desired microstructure change.

The temperature sensors disclosed herein may be well suited for determining the precise locations of specific, target temperatures, even in very high temperature locations, such as locations with temperatures approaching 2,000° C., without the need for calibration, without the risk of drift, and without the risk of negative impacts from, e.g., neutron flux in a nuclear reactor.

In some embodiments, the temperature sensors may be formed to include the phase-change material initially in its gaseous form. For example, the temperature sensor may be configured to determine the deposition temperature of a phase-change material that is gaseous at room temperature but that deposits from gas to solid at cold temperatures. Such temperature sensor may be placed in an environment that is expected to have an area above the phase-change material's deposition temperature as well as an area below the phase-change materials' deposition temperature. The phase-change material may, therefore, deposit to solid grains to indicate the precise location of the material's deposition temperature. The temperature sensor could be reset merely by removing the sensor from the cold environment to room temperature to sublimate the solid grains back into their initial gaseous form.

While the disclosed sensors and methods are susceptible to various modifications and alternative forms in implementation thereof, specific embodiments have been shown by way of example in the drawings and have been described in detail herein. However, it should be understood that the present invention is not limited to the particular forms disclosed. Rather, the present invention encompasses all modifications, combinations, equivalents, variations, and alternatives falling within the scope of the present disclosure as defined by the following appended claims and their legal equivalents.

What is claimed is:

1. A temperature sensor, comprising:
   an enclosure defining a sealed volume at a known pressure; and
   a phase-change material within the sealed volume, the phase-change material formulated to change from a gaseous phase to a solid phase, without condensing to a liquid phase, at the known pressure and a predetermined deposition temperature.

2. The temperature sensor of claim 1, wherein the phase-change material consists of a high-purity element.

3. The temperature sensor of claim 1, wherein the enclosure comprises an opaque material.

4. The temperature sensor of claim 1, further comprising at least one other phase-change material within the sealed volume, the at least one other phase-change material formulated to change from a gaseous phase to a solid phase, without condensing to a liquid phase, at the known pressure and another predetermined deposition temperature.

5. The temperature sensor of claim 1, further comprising electrodes extending into the sealed volume.

6. The temperature sensor of claim 1, wherein the enclosure comprises a translucent material.

7. The temperature sensor of claim 6, wherein the translucent material comprises quartz or sapphire.

8. The temperature sensor of claim 1, further comprising at least one other enclosure defining therein another sealed volume at another known pressure.

9. The temperature sensor of claim 8, further comprising another amount of the phase-change material within the other sealed volume of the other enclosure.

10. The temperature sensor of claim 8, wherein the other known pressure is about equal to the known pressure.

11. The temperature sensor of claim 10, further comprising another phase-change material within the other enclosure.

12. A method of forming a temperature sensor, the method comprising enclosing a phase-change material within a sealed volume at a known pressure, the phase-change material formulated to exhibit a gas-to-solid phase change at the known pressure and a predetermined deposition temperature.

13. The method of claim 12, wherein enclosing a phase-change material within a sealed volume at a known pressure comprises enclosing the phase-change material within the sealed volume below the triple point of the phase-change material.

14. The method of claim 12, wherein enclosing a phase-change material within a sealed volume at a known pressure comprises enclosing a solid mass of the phase-change material within the sealed volume at the known pressure.

15. The method of claim 12, wherein enclosing a phase-change material within a sealed volume at a known pressure comprises enclosing another phase-change material within the sealed volume at the known pressure, the other phase-change material formulated to exhibit a gas-to-solid phase change at the known pressure and a different predetermined deposition temperature.

16. A method for using a temperature sensor to determine a location of a predetermined temperature within an environment, the method comprising:
  disposing, within the environment, a temperature sensor comprising an enclosure and a phase-change material, the enclosure defining a sealed volume at a known pressure, the phase-change material being within the sealed volume and being formulated to change from a gaseous phase to a solid phase, without condensing to a liquid phase, at the known pressure and a predetermined deposition temperature equal to the predetermined temperature;
  with the phase-change material at least partially in the gaseous phase, and not in the liquid phase, retaining the sealed volume within the environment as the phase-change material changes from the gaseous phase to the solid phase, forming solid grain deposits within the sealed volume; and
  measuring a location of the solid grain deposits to determine the location of the predetermined temperature.

17. The method of claim 16, further comprising, after measuring the location of the solid grain deposits, exposing the solid grain deposits to temperatures above a sublimation temperature of the phase-change material to reset the temperature sensor.

18. The method of claim 16, wherein disposing, within the environment, the temperature sensor comprises disposing, within the environment, the temperature sensor while the phase-change material is in the solid phase.

19. The method of claim 18, further comprising, prior to retaining the sealed volume within the environment as the phase-change material changes from the gaseous phase to the solid phase, exposing the sealed volume to temperatures within the environment exceeding a sublimation temperature of the phase-change material.

20. A method of using a temperature sensor to determine a location of a maximum temperature within an environment, the method comprising:
  providing a temperature sensor comprising a solid mass of a phase-change material within a sealed volume at a known pressure, the sealed volume defined by an enclosure of the temperature sensor, the solid mass disposed in a central portion of the temperature sensor, the phase-change material being formulated to change from a gaseous phase to a solid phase, without condensing to a liquid phase, at the known pressure and a predetermined deposition temperature;
  disposing the temperature sensor within the environment and exposing the solid mass to a temperature greater than a sublimation temperature of the phase-change material;
  within the environment, exposing distal ends of the temperature sensor to temperatures equal to or less than the predetermined deposition temperature of the phase-change material to deposit solid grains of the phase-change material within the sealed volume proximate each of the distal ends of the temperature sensor; and
  measuring a mid-point between the solid grains to determine the location of the maximum temperature within the environment.

21. The method of claim 20, further comprising determining a grain size of the solid grains.

* * * * *